United States Patent

Matsumoto et al.

Patent Number: 5,240,540
Date of Patent: Aug. 31, 1993

[54] METHOD FOR PRODUCING FILTER ELEMENT

[75] Inventors: Noriya Matsumoto, Okazaki; Yoshihiko Oya, Takahama; Hajime Akado, Anjo; Yoshihiro Taki, Nagoya; Kazumi Nonoyama, Aichi; Takanari Okumura, Nagoya, all of Japan

[73] Assignee: Nippondenso Co., Ltd., Kariya, Japan

[21] Appl. No.: 645,983

[22] Filed: Jan. 23, 1991

[30] Foreign Application Priority Data

Jan. 25, 1990 [JP] Japan .................. 2-015866

[51] Int. Cl.$^5$ .............................. B29C 65/02
[52] U.S. Cl. .................... 156/252; 156/253; 156/292; 156/296; 156/298; 264/154
[58] Field of Search ............ 156/309.6, 197, 252, 156/292, 296, 298, 303.1, 253; 264/154; 428/116, 118; 210/321.8, 321.88, 321.89, 321.9

[56] References Cited

U.S. PATENT DOCUMENTS

| | | |
|---|---|---|
| 2,042,564 | 6/1936 | Sweetland . |
| 2,576,864 | 11/1951 | Valente et al. . |
| 2,599,604 | 6/1952 | Bauer et al. . |
| 3,656,992 | 4/1972 | Lynam et al. ............ 156/197 |
| 3,728,186 | 4/1973 | Mohn ........................ 156/252 |
| 4,249,974 | 2/1981 | Wilson ...................... 156/252 |
| 4,293,357 | 10/1981 | Higuchi et al. ............ 428/116 |
| 4,432,857 | 2/1984 | Stanier ...................... 156/252 |
| 4,557,773 | 12/1985 | Bonzo ....................... 156/253 |
| 4,756,835 | 7/1988 | Wilson . |
| 4,980,060 | 12/1990 | Muto et al. ............... 210/321.9 |
| 5,002,666 | 3/1991 | Matsumoto et al. ....... 210/321.89 |
| 5,032,208 | 7/1991 | Strauss ...................... 156/296 |

FOREIGN PATENT DOCUMENTS

| | | |
|---|---|---|
| 58-11020 | 1/1983 | Japan . |
| 60-18337 | 1/1985 | Japan . |
| 1-41732 | 6/1989 | Japan ........................ 156/247 |

Primary Examiner—Michael W. Ball
Assistant Examiner—Steven D. Maki
Attorney, Agent, or Firm—Cushman, Darby & Cushman

[57] ABSTRACT

A method for producing a filter element has three steps. In first step, a filter body including at least one first passageway and at least one second passageway or clearance extends closely and substantially parallel to the first passageway and communicate with first hole through a filter material is formed. In second step, a sheet-shaped thermoplastic adhesive is arranged on one end of the filter body, the first passageway and the second passageway or clearance are open at the one end of the filter body. In third step, the sheet-shaped thermoplastic adhesive is melted by heating to close and seal an end of the second passageway or clearance at the one end of the filter body so that the passageways do not deform.

9 Claims, 8 Drawing Sheets

FIG. 15A
(PRIOR ART)
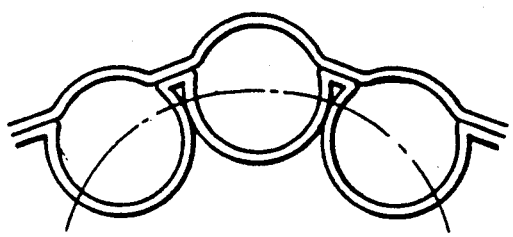
FIG. 15B
(PRIOR ART)
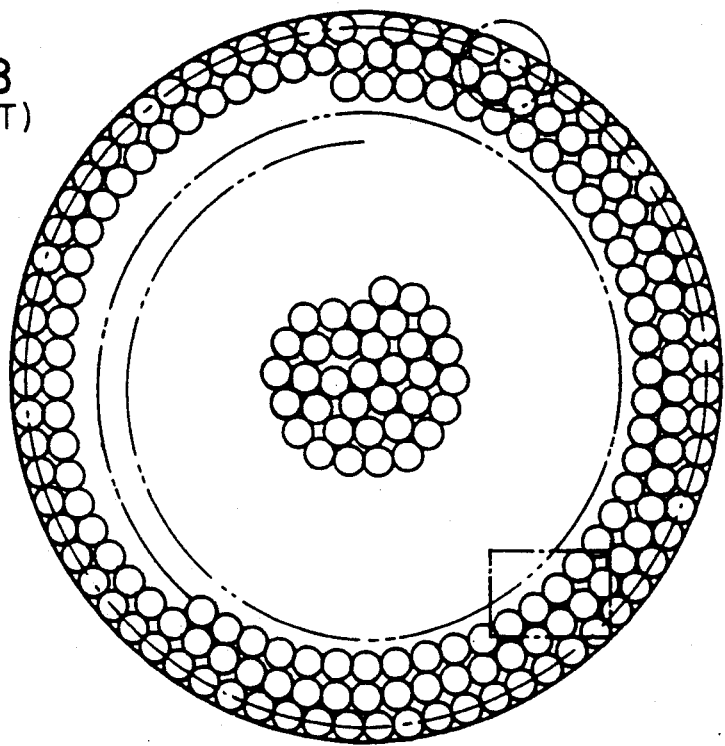
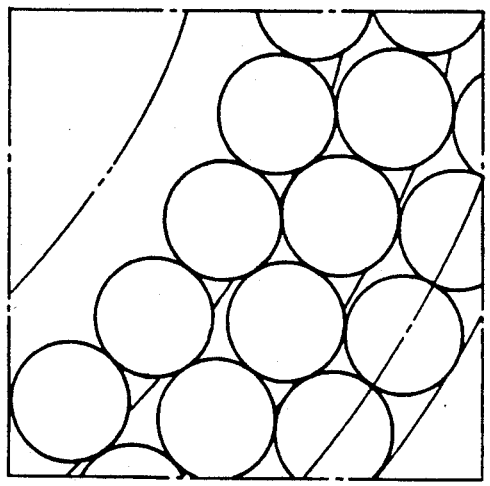
FIG. 15C
(PRIOR ART)

METHOD FOR PRODUCING FILTER ELEMENT

BACKGROUND OF THE INVENTION AND RELATED ART STATEMENT

The present invention relates to a method for producing a filter element suitable for a fuel filter, a lubricant filter and so forth.

For improving a filtering efficiency by increasing an effective filtering area in a limited volume of a filter, a honeycomb construction of sheet-shaped filter material without a chrysanthemum-flower-shaped bending construction of sheet-shaped filter material is proposed.

In disclosures of Japanese Patent Examined Publication No. 61-50612 and U.S. Patent Publication No. 2599604, a flat sheet filter material and a wave-shaped sheet filter material are fixed to each other to form a combination sheet with a plurality of first small holes therebetween and the combination sheet is rolled into a cylindrical body with the first small holes and a plurality of second small holes formed between adjacent layers in the rolled combination sheet. At an end of the cylindrical body, one end of each of the first small holes is filled with an adhesive to be hermetically sealed and ends of the second small holes are open. At another end of the cylindrical body, one end of each of the second small holes is filled with an adhesive to be hermetically sealed and ends of the first small holes are open, so that a liquid can flow through filtering areas formed between the second small holes and the first small holes. The combination sheet may consist of a pair of wave-shaped sheet filter materials fixedly connected to each other through adhered flat portions between semi-circular portions, as shown in FIG. 13.

OBJECT AND SUMMARY OF THE INVENTION

The object of the present invention is to provide a method for producing a filter element including first passageways and second passageways or clearances which extend substantially parallel to the first passageways and communicate with first passageways through filters and whose ends are closed at one end of the filter element.

According to the present invention, a method for producing a filter element, comprises a first step wherein a filter body including at least one first passageway and at least one second passageway which extends closely and substantially parallel to the first passageway and communicate with first passageway through a filter material is formed, a second step wherein a sheet-shaped thermoplastic adhesive is arranged on one end of the filter body, the first hole and the second passageway are open at the one end of the filter body, and a third step wherein the sheet-shaped thermoplastic adhesive is melted to close and seal an end of the second passageway at the one end of the filter body so that the filter element is formed without deformations of the holes by a force for sealing.

In the method according to the present invention, since the end of the second passageway are closed at the one end of the filter body by the melting of the sheet-shaped thermoplastic adhesive arranged on the one end of the filter body and the melt of the sheet-shaped thermoplastic adhesive does not generate a large deformation force, the large force is not applied to the end of the second passageways and the end of the second passageways are not deformed largely by the closing operation thereof. Therefore, at the one end of the filter body, a shape of an end of the first passageway extending substantially parallel to the second passageways is kept securely at a desired shape.

BRIEF DESCRIPTION OF THE DRAWINGS

FIG. 15A is an enlarged view of area A of the filter body of FIG. 15B.

FIG. 15B is a front plan view showing a structure of the filter body used in an embodiment of the present invention.

FIG. 15C is an enlarged view of area C of the filter body of FIG. 15B.

DETAILED DESCRIPTION OF PREFERRED EMBODIMENTS

Figure 10:
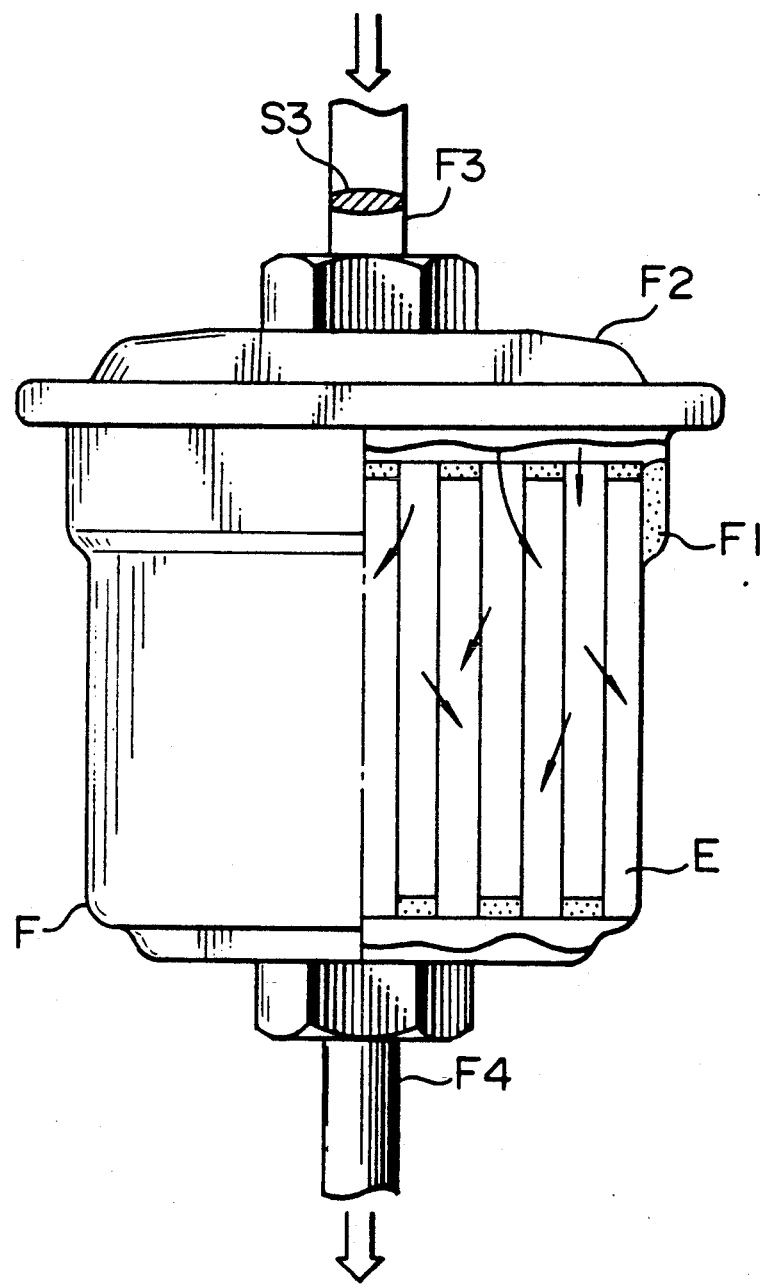
FIG. 10 is a partially cross-sectional side view showing a fuel filter including the filter body.

FIG. 10 shows a fuel filter which is arranged on a fuel line for supplying a fuel to an engine and which includes a filter case F made of iron or plastic resins and a filter element E received by the filter case F. An upper and outer periphery of the filter element E is fixed to an inner wall of the filter case F by an adhesive F1. An upper opening part of the filter case F is covered by a cover F2, and an outer periphery of the cover F2 is fixed to the upper opening part of the filter case F by caulking portion. A fuel is introduced into the fuel filter through an inlet F3 arranged at a center of the cover F2, passes the filter element E, and is supplied to the engine (not shown) through an outlet F4 arranged at a bottom surface of the filter case F.

In a method for producing a filter element E, according to the present invention, a filter material of filter members 1, 2 is a filter paper, or a nonwoven fabric, or a wire net, a synthetic textile, or any suitable material. When the filter element is used in the fuel filter, a thickness of the filter members 1, 2 may be about 0.14 mm, because a flow speed of liquid in the fuel filter is smaller in comparison with the other oil filters.

Figure 3:
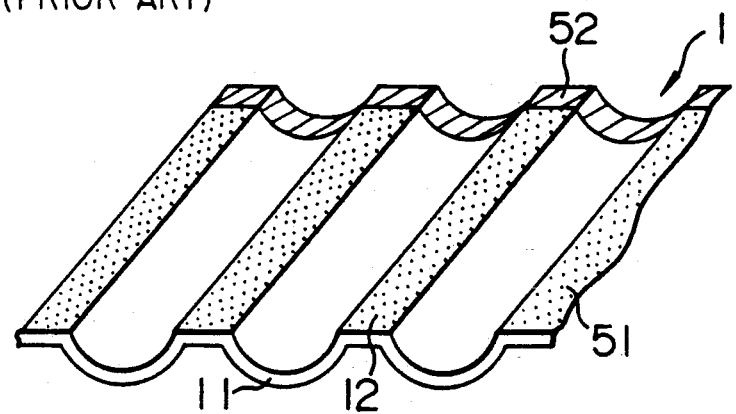
FIG. 3 is an oblique projection view showing a wave-shaped filter member of the filter sheet.
Figure 4:
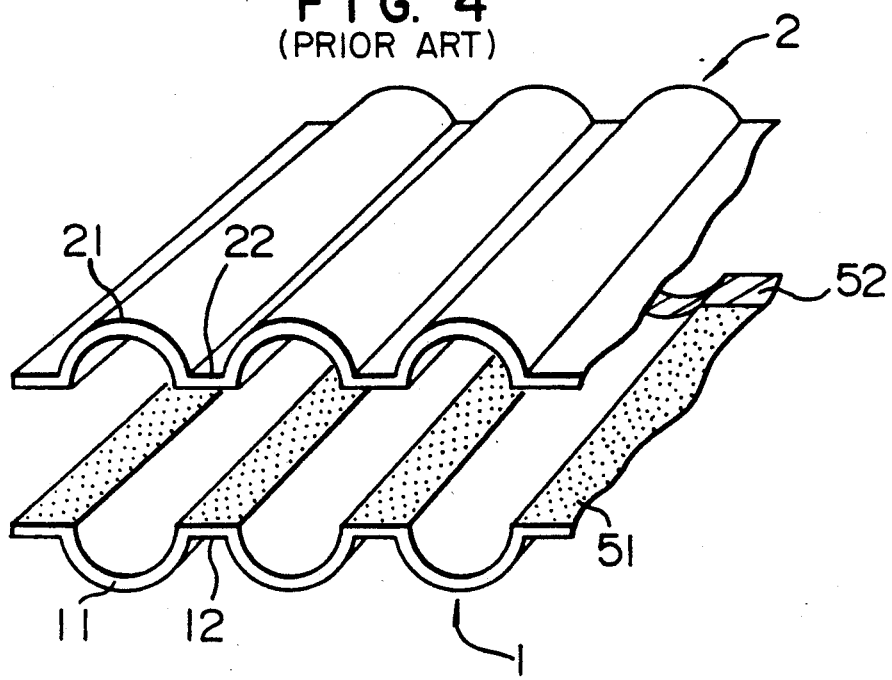
FIG. 4 is an oblique projection view showing a pair of the wave-shaped filter members before being assembled with each other.
Figure 5A:
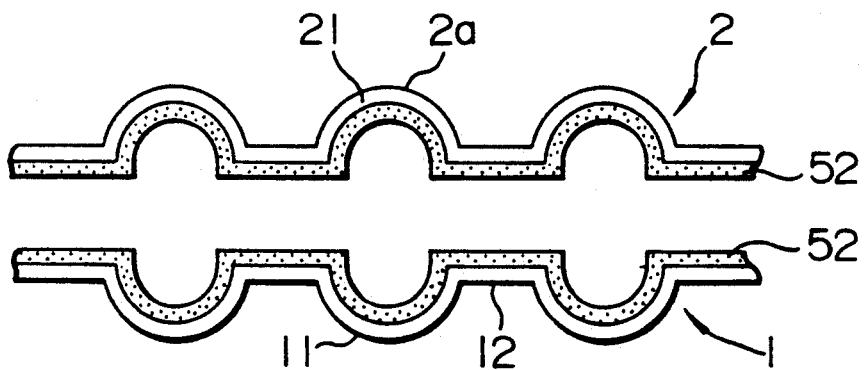
FIG. 5A is a side plan view showing the pair of the wave-shaped filter members before being assembled with each other.
Figure 5B:
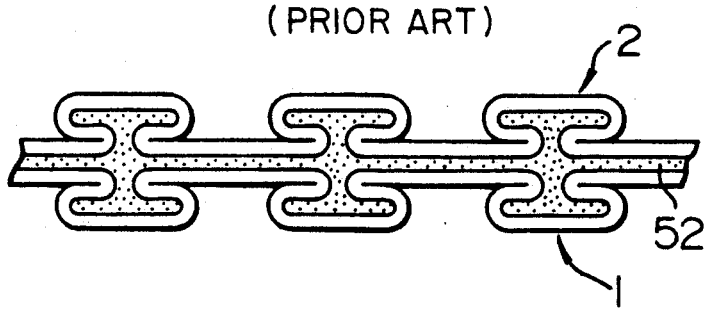
FIG. 5B is a side plan view showing the pair of the wave-shaped filter members after being assembled with each other.

An adhesive sheet 52 made of a polyamide-type hot melt adhesive is fixed to a side end of each of the band-shaped filter members 1, 2 by, for example, a heat-and-press process. The thickness of the adhesive sheet 52 is 100 μm. Subsequently, semi-circular portions 11, 21 and flat portions 12, 22 therebetween are formed on the band-shaped filter members 1, 2 by, for example, a wave-shaped roller, as shown in FIGS. 3 and 4. The flat portions 12 on the band-shaped filter member 1 are fixed to the flat portions 22 on the band-shaped filter member 2 respectively by an adhesive 51 so that elongated passages 3 are formed respectively between the semi-circular portions 11, 21 by fixing flat portions 12 of the filter member 1 to flat portions 22 of filter member 2. Thereafter, the side ends of the band-shaped filter members 1, 2 with the adhesive sheet 52 are pressed against each other with heating so that the side ends of the band-shaped filter members 1, 2 are sealed and the end of each of the elongated passages 3 between the semi-circular portions 11, 21 is closed, as shown in FIGS. 5A and 5B.

Figure 1:
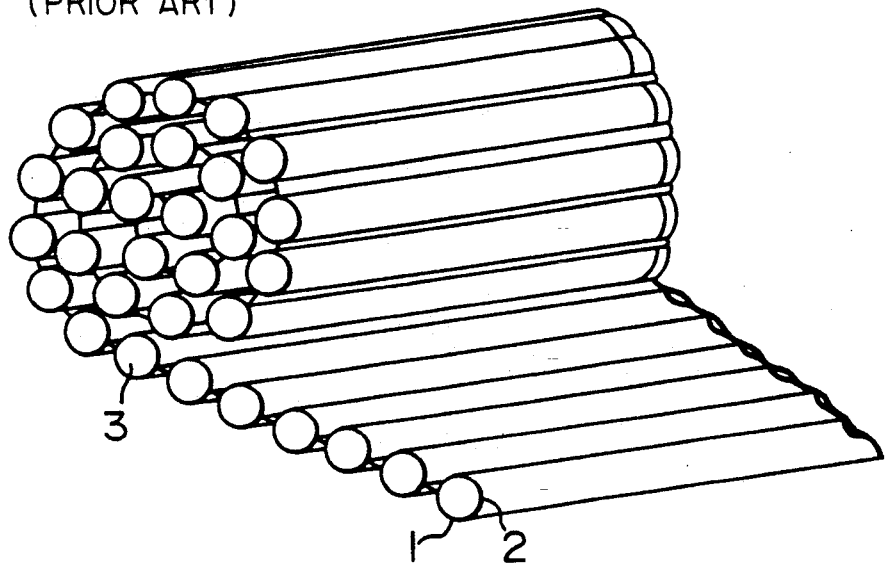
FIG. 1 is an oblique projection view showing a spirally rolled filter sheet including a plurality of holes.
Figure 2:
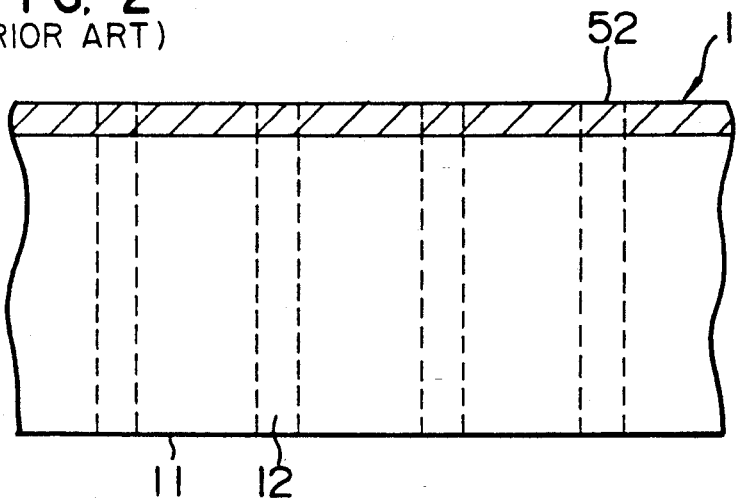
FIG. 2 is a front plan view showing a wave-shaped filter member of the filter sheet.
Figure 6:
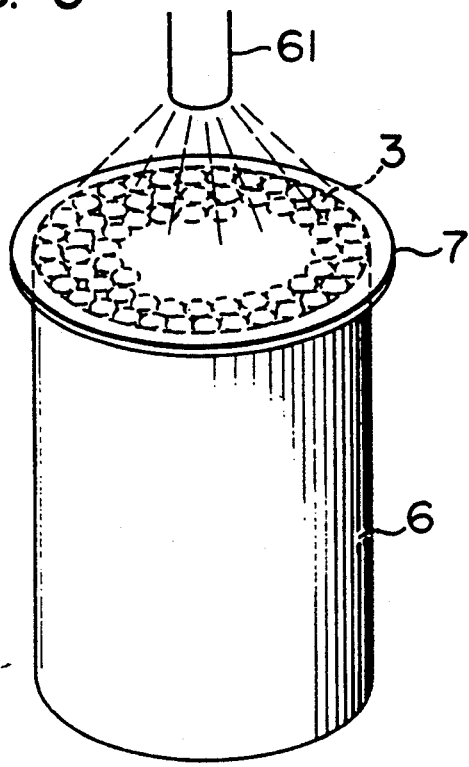
FIG. 6 is an oblique projection view showing a hot-melt sheet arranged on one end of a filter body including the filter sheet.

A combination of the band-shaped filter members 1, 2 is spirally rolled into a cylindrical filter body, as shown in FIG. 1. And the cylindrical filter body is inserted into a container 6 with, for example, 45 mm outer diameter as shown in FIG. 15. As shown in FIG. 6, a hot-melt or thermoplastic sheet-shaped adhesive 7 (thickness 200–300 μm) of, for example, polyamide-type is arranged on an end of the cylindrical filter body of the band-shaped filter members 1, 2, which end is an opposite end from the sealed side ends of the band-shaped filter members 1, 2. Subsequently, the hot-melt sheet-shaped adhesive 7 is melted by heating it more than the melting temperature thereof between 200 degrees C. and 300 degrees C. for 10 to 30 seconds and is cooled less than the melting temperature thereafter so that clearances 31, formed between filter member 1, 2, when filter member 1, 2 which are fixed together are spirally rolled into a cylindrical filter body, other than the elongated passageways 3 in the filter body are filled and sealed with the hot-melt adhesive 7. In the heating of the hot-melt sheet-shaped adhesive 7, it is preferable to heat only the hot-melt sheet-shaped adhesive 7 by blowing hot air onto the hot-melt sheet-shaped adhesive 7 or by focusing infrared rays toward the hot-melt sheet-shaped adhesive 7. Both of the thermoplastic sheet-shaped adhesive 7 and the cylindrical filter body may be heated in a circumferential condition of 200 to 300 degrees C. for 2 to 3 seconds so that the thermoplastic sheet-shaped adhesive 7 deforms to closely contact and to slightly join the filter body before the hot-melt sheet-shaped adhesive 7 is melted by heating it for 10 to 30 seconds.

Figure 7:
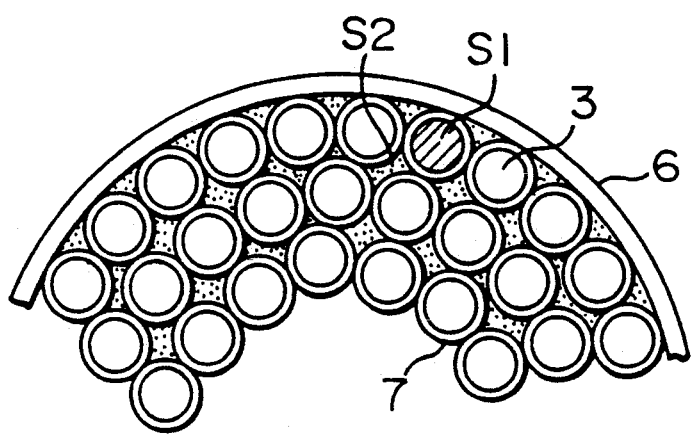
FIG. 7 is a front plan view showing an arrangement of the first holes and the second holes at the end of the filter body on which a sheet-shaped adhesive is arranged, according to the present invention.
Figure 8:
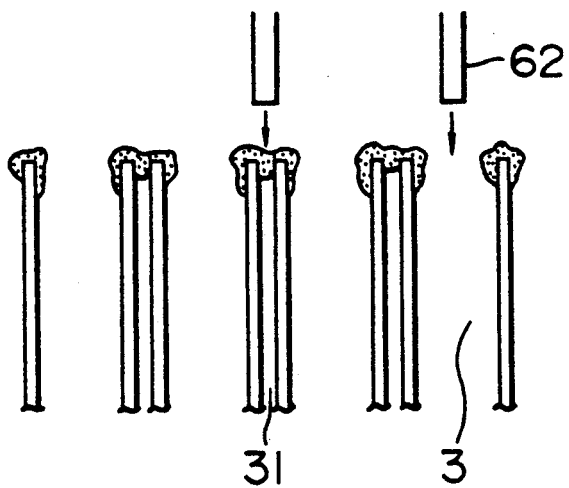
FIG. 8 is a side cross-sectional view showing the arrangement in the filter body contained by the container and including the first holes and the second holes.
Figure 14:
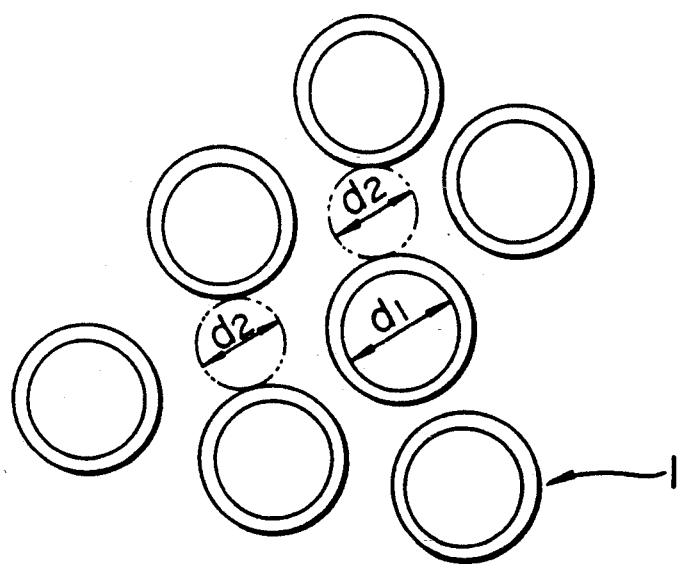
FIG. 14 is a plan view showing the arrangement of the first holes and the second hole at the end of the filter body on which a sheet-shaped adhesive is arranged, according to the present invention.

The hot-melt sheet-shaped adhesive 7 may be melted partially and selectively by a controlled heat energy of nozzle-jet hot air or focused infrared rays generated by a partial heater 62 shown in FIG. 8 on each of the elongated passageways 3 and on each of the clearances 31 to open the elongated passageways 3 by relatively large heat energy and to make the seal on the clearances 31 by relatively small heat energy. If the smallest area S1 of the elongated passageways 3 is larger than the largest area S2 of the clearances 31 other than the elongated passageways 3 at the end of the filter body on which the hot-melt sheet-shaped adhesive 7 is arranged, it is securely done that the hot-melt sheet-shaped adhesive 7 on all of the elongated passageways 3 drops into the elongated passageways 3 and the hot-melt sheet-shaped adhesive 7 on all of the clearances 31 other than the elongated passageways 3 remains thereon to seal them, as shown in FIGS. 7 and 8, when the whole of the hot-melt sheet-shaped adhesive 7 is melted at a time by, for example, a whole-range heater 61 shown in FIG. 6. Or, if a diameter d1 of the smallest imaginary circlet capable of being received in the elongated passageways 3 is larger than a diameter d2 of the largest imaginary circlet capable of being received in the clearances 31 at the end of the filter body on which the hot-melt sheet-shaped adhesive 7 is arranged as shown in FIGS. 14 and 15, it is securely done that the hot-melt sheet-shaped adhesive 7 on all of the elongated passageways 3 drops into the elongated passageways 3 and the hot-melt sheet-shaped adhesive 7 on all of the clearances 31 other than the elongated passageways 3 remains thereon to seal them, when the whole of the hot-melt sheet-shaped adhesive 7 is melted at a time by, for example, the whole-range heater 61 shown in FIG. 6, because a not-supported length of the hot-melt sheet-shaped adhesive 7 on each of the holes or clearances is equal to or less than the diameter of the circlet capable of being received in the each of the holes or clearances and the diameter d1 of the smallest imaginary circlet capable of being received in the elongated passageways 3 is larger than the diameter d2 of the largest imaginary circlet capable of being received in the clearances 31 so that the smallest not-supported length of the hot-melt sheet-shaped adhesive 7 on the elongated passageways 3 is larger than the largest not-supported length of the hot-melt sheet-shaped adhesive 7 on the clearances 31 to make securely a difference in rigidity between the hot-melt sheet-shaped adhesive 7 on the elongated passageways 3 and the hot-melt sheet-shaped adhesive 7 on the clearances 31, that is, to make the rigidity of the hot-melt sheet-shaped adhesive 7 on all of the elongated passageways 3 less than that on all of the clearances 31.

Figure 9:
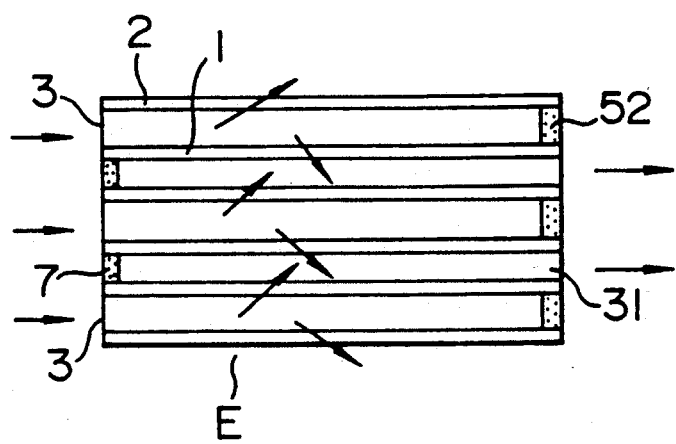
FIG. 9 is a side cross-sectional view showing a flow of liquid in the filter body.

In this way, at one end of the filter body, the ends of the clearances 31 are closed or sealed by the hot-melt sheet-shaped adhesive 7 and the ends of the elongated passageways 3 are open, and at the other end thereof, the ends of the elongated passageways 3 are closed or sealed by the adhesive sheet 52 and the ends of the clearances 31 are open, as described before, as shown in FIG. 9. For improving filtering efficiency of filter element determined on the basis of a volume, a number of filter paths and a pressure loss thereof, the diameter of the elongated passageways 3 is preferably 1.5 to 2.5 mm. In the embodiment of the present invention, since the elongated passageways 3 have cylindrical shapes, a total amount of cross-sectional areas S1 of the elongated passageways 3 can be made significantly larger than that of cross-sectional areas S2 of the clearances 31 and a total amount of areas of inner surfaces of the elongated passageways 3 can be made significantly large so that a filtering performance is improved largely, or in the other words, a volume of filter body may be small. Incidentally, the total amount of cross-sectional areas S2 of the clearances 31 is larger than a cross-sectional area S3 of the smallest diameter part in the inlet F3, the outlet F4 and so forth so that a pressure loss in the elongated passageways 3 is made significantly small. As shown by arrows in FIG. 9, a fuel flows from the elongated passageways 3 through the filter members 1, 2 to the clearances 31 to supply the clean fuel to the engine. Since cross-sectional shapes of the elongated passageways 3 are circular, their deformations by an increase in pressure difference caused by the fuel pressure and/or a dirt of the filter members 1, 2 between the elongated passageways 3 and the clearances 31 can be kept very small and a decrease in filtering performance is prevented.

If the areas S1 of the elongated passageways 3 are substantially constant and the areas S2 of the clearances 31 are also substantially constant over a whole range of the end of the filter body, the ratio of the average area S2 of the clearances 31 to the average area S1 of the elongated passageways 3 is preferably less than 0.4 so that the difference in rigidity between the hot-melt sheet-shaped adhesive 7 on the elongated passageways 3 and the hot-melt sheet-shaped adhesive 7 on the clearances 31 is made significantly large. In this embodiment, if the diameters of the elongated passageways 3 are constantly 1.5 to 2.5 mm, the thickness of the hot-melt sheet-shaped adhesive 7 may be 80 to 300 μm. The hot-melt sheet-shaped adhesive 7 may be, for example, polyamide type or polyethylene type or polyolefine type.

Figure 11:
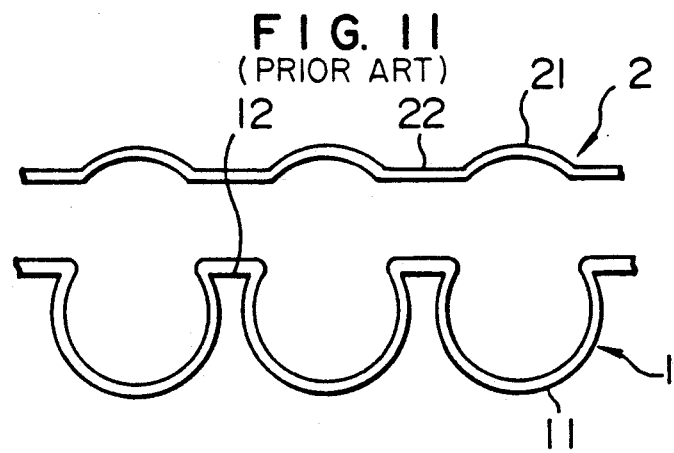
FIG. 11 is a side plan view showing a pair of members constituting the filter body, before assembling the members.
Figure 12:
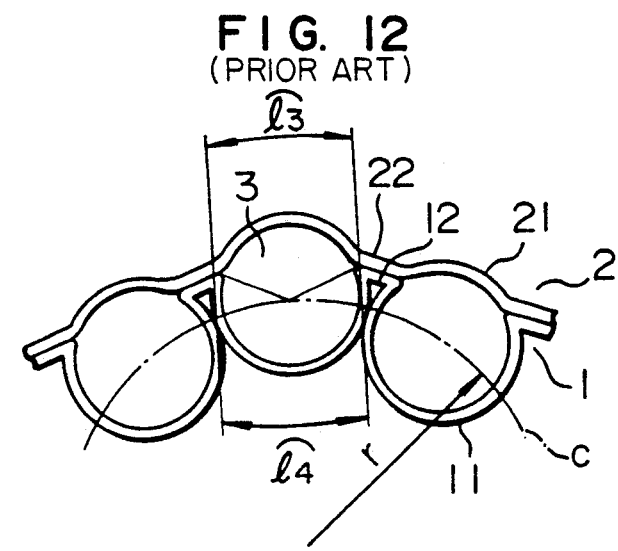
FIG. 12 is a side plan view showing the pair of members constituting the filter body, after assembling the members.
Figure 13:
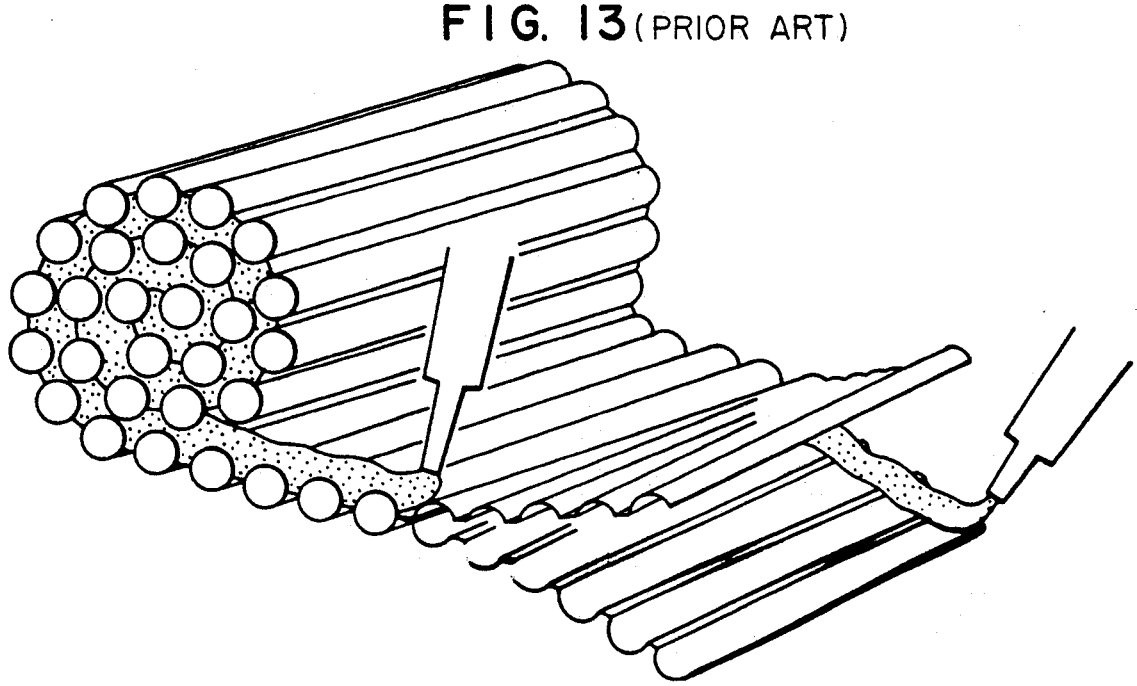
FIG. 13 is an oblique projection view showing a method for producing a filter body in the prior art.

In the filter members 1, 2 shown in FIGS. 11 and 12, the portions 12 and 22 through which the adjacent combinations of the portions 11 and 21 forming respectively the circular elongated passageways 3 are connected to each other extend separately from an axis C extending between centers of the circular elongated passageways 3 so that the adjacent surfaces of the combinations of the portions 11 and 21 can contact with each other. Therefore, when the combination of the filter members 1, 2 is spirally rolled into the cylindrical filter body, the combinations of the portions 11 and 21 contact with each other and distances between the centers of the circular elongated passageways 3 are small so that the areas of the clearances 31 are small. Since the total amount of the areas of the elongated passageways 3 in the filter body is increased, an effective filtering area is increased therein, in other words, the filter body may be small.

What is claimed is:

1. A method for producing a filter element, comprising the steps of:
    forming at least one first elongated passageway substantially parallel to at least one second elongated passageway in a filter body, said passageways being generally adjacent, the ends of said first and second passageways being open at one end of the filter body, the opening area of said first passageway being larger than the opening area of said second passageway, said second passageway communicating with said first passageway through a filter material;
    arranging a sheet-shaped thermoplastic adhesive on said one end of the filter body; and
    melting said sheet-shaped thermoplastic adhesive so as to close and seal said end of said second passageway and to simultaneously open said end of said first passageway due to magnitudes of said opening area of said first passageway and said opening area of said second passageway.

2. A method according to claim 1, wherein the step of melting said sheet-shaped thermoplastic adhesive includes applying a large amount of heat energy to said first passageway and applying an amount of heat energy that is less than the amount applied to said first passageway to said second passageway.

3. A method according to claim 1, wherein the entire sheet-shaped thermoplastic adhesive is melted.

4. A method according to claim 1, wherein a diameter of a smallest imaginary circlet capable of being received in the first passageway is larger than a diameter of a largest imaginary circlet capable of being received in the second passageway at the one end of the filter body on which the sheet-shaped thermoplastic adhesive is arranged.

5. A method according to claim 4, wherein the entire sheet-shaped thermoplastic adhesive is melted.

6. A method according to claim 1, wherein a ratio of the opening area of the second passageway to the opening area of the first passageway is less than 0.4 prior to melting said adhesive.

7. A method according to claim 1, wherein the filter body has a plurality of the first passageways and a plurality of the second passageways, the opening areas of the first passageways are substantially constant and the opening areas of the second passageways are also substantially constant over a whole range of the one end of the filter body.

8. A method according to claim 1, wherein the filter body has a plurality of the first passageways and a plurality of the second passageways, the smallest opening area of one of the first passageways is larger than the largest opening area of one of the second passageways at the one end of the filter body.

9. A method according to claim 1, wherein a thickness of the sheet-shaped thermoplastic adhesive is 80 to 300 μm, when the first passageway is substantially circular and a diameter thereof is 1.5 to 2.5 mm.

* * * * *